США009416811B2

(12) United States Patent
Dobbin (10) Patent No.: US 9,416,811 B2
(45) Date of Patent: Aug. 16, 2016

(54) INJECTABLE NUT CAP (71) Applicant: AIRBUS OPERATIONS LIMITED, Bristol (GB)

(72) Inventor: Richard Dobbin, Monmouthshire (GB)

(73) Assignee: AIRBUS OPERATIONS LIMITED, Bristol (GB)

( * ) Notice: Subject to any disclaimer, the term of this patent is extended or adjusted under 35 U.S.C. 154(b) by 285 days.

(21) Appl. No.: 14/274,332

(22) Filed: May 9, 2014

(65) Prior Publication Data
US 2014/0341675 A1 Nov. 20, 2014

(30) Foreign Application Priority Data

May 16, 2013 (GB) .................................. 1308873.7

(51) Int. Cl.
*A47G 3/00* (2006.01)
*F16B 37/14* (2006.01)
*B64D 45/02* (2006.01)
*F16B 33/00* (2006.01)
*F16B 43/02* (2006.01)

(52) U.S. Cl.
CPC ................ *F16B 37/14* (2013.01); *B64D 45/02* (2013.01); *F16B 33/004* (2013.01); *F16B 43/02* (2013.01); *Y10T 29/49982* (2015.01); *Y10T 29/52* (2015.01)

(58) Field of Classification Search
CPC ... F16B 19/05; F16B 37/14; Y10T 29/49966; B64D 45/02
USPC .................................................. 411/82.1, 373
See application file for complete search history.

(56) References Cited

U.S. PATENT DOCUMENTS

| 3,548,704 | A |   | 12/1970 | Kutryk |  |
|---|---|---|---|---|---|
| 4,400,123 | A | * | 8/1983 | Dunegan | F16B 37/14 116/270 |
| 4,826,380 | A | * | 5/1989 | Henry | B64D 45/02 156/229 |
| 5,048,898 | A | * | 9/1991 | Russell | B60B 7/00 301/37.374 |
| 5,082,409 | A | * | 1/1992 | Bias | F16B 37/14 411/372.5 |
| 5,273,384 | A | * | 12/1993 | Dunbar | F16B 37/041 411/174 |
| 5,338,141 | A | * | 8/1994 | Hulsey | F16B 33/008 411/369 |

(Continued)

FOREIGN PATENT DOCUMENTS

FR 2626629 A1 8/1989

OTHER PUBLICATIONS

Search Report dated Sep. 16, 2013 in GB Application No. 1308873.7.

*Primary Examiner* — Gary Estremsky
(74) *Attorney, Agent, or Firm* — Hauptman Ham, LLP (57) ABSTRACT

The description provides a method of forming a seal around an end of a fastener protruding from a structure. The cap includes a cap body with a cavity; a sealing material inlet comprising an opening in the cap body; three or more ridges protruding from the cap body into the cavity; and three or more channels between the ridges. The method includes: installing the cap body over the end of the fastener so that it is enclosed within the cavity and contacted by the ridges; injecting sealing material into the cavity via the sealing material inlet so that the sealing material flows along the channels, fills the cavity, contacts the end of the fastener, and contacts the structure; and curing the sealing material to form the seal.

19 Claims, 8 Drawing Sheets

(56) References Cited

U.S. PATENT DOCUMENTS

| | | | | |
|---|---|---|---|---|
| 5,752,795 A | * | 5/1998 | D'Adamo | F16B 37/14 411/373 |
| 5,810,532 A | * | 9/1998 | Huang | F16B 37/14 411/377 |
| 6,086,972 A | * | 7/2000 | Rayburn | B25B 23/00 411/373 |
| 6,135,691 A | * | 10/2000 | Nadarajah | F16B 37/14 411/372.6 |
| 6,176,267 B1 | * | 1/2001 | Dugan | F16L 55/1157 138/89 |
| 6,238,158 B1 | * | 5/2001 | Clements | F16B 37/14 411/372.6 |
| 2014/0234050 A1 | * | 8/2014 | Asahara | B64D 45/02 411/371.1 |

\* cited by examiner

INJECTABLE NUT CAP

RELATED APPLICATIONS

The present application claims priority from Great Britain Application Number 1308873.7, filed May 16, 2013, the disclosure of which is hereby incorporated by reference herein in its entirety.

FIELD OF THE INVENTION

The present invention relates to a cap for forming a seal around an end of a fastener protruding from a structure, a joint comprising such a cap, and a method for installing such a cap.

BACKGROUND OF THE INVENTION

Figure 1:
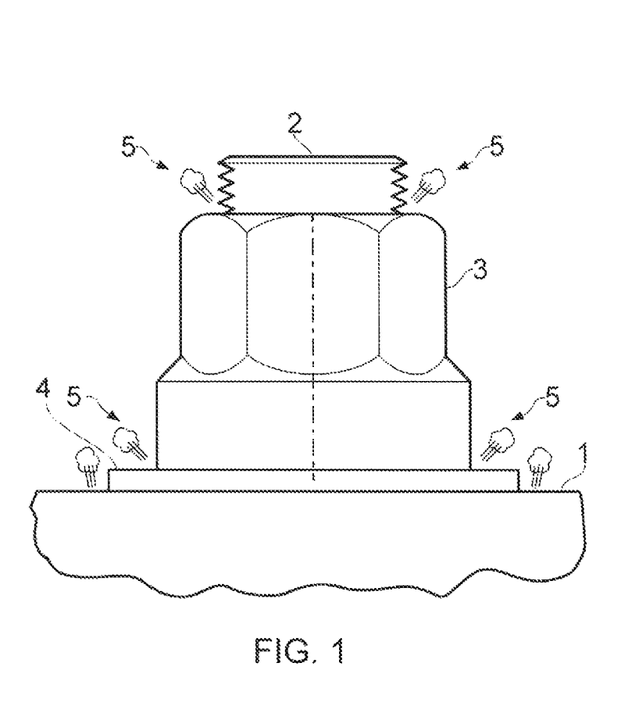
FIG. 1 is a side view of a prior art nut and bolt assembly.

FIG. 1 is a side view of a protruding and of a fastener assembly passing through a panel 1, which may be a composite or metallic panel. The assembly comprises a fastener comprising an externally threaded bolt 2, an internally threaded nut 3, and a washer 4 (the fastener may alternatively comprise any other known fastener type, such as a rivet or swage fastener). In the event of a lightning strike hitting the panel 1 and attaching to the fastener, sparking, plasma or out-gassing may occur at the locations indicated by reference 5 in FIG. 1.

SUMMARY OF THE INVENTION

A first aspect of the invention provides a method of forming a seal around an end of a fastener protruding from a structure, the cap comprising a cap body with a cavity; a sealing material inlet comprising an opening in the cap body; three or more ridges protruding from the cap body into the cavity; and three or more channels between the ridges, the method comprising: installing the cap body over the end of the fastener so that it is enclosed within the cavity and contacted by the ridges; injecting sealing material into the cavity via the sealing material inlet so that the sealing material flows along the channels, fills the cavity, contacts the end of the fastener, and contacts the structure; and curing the sealing material to form the seal.

Since the sealing material is injected after positioning of the cap onto an end of a fastener it is possible to use sealing materials with short handling and curing times. The sealing material can be mixed in the sealing material injection device on application, thus ensuring that the material is applied during its working life and before it has started to cure. Quick cure sealing materials have the advantage of providing a stable bond very quickly. That is, the installed cap will be able to withstand accidental knocks or similar from assembly workers within a short timeframe.

The ridges may serve to locate the cap so that the end of the fastener is located centrally within the cavity.

The ridges preferably grip the end of the fastener so that it is not forced off by the action of fluid pressure as the sealant material is injected.

The sealing material fills the cavity, contacts the end of the fastener, and contacts the structure. This prevents air gaps within the cavity and thus prevents the ingress of fuel, water or other contaminants into the cavity.

Although the sealing material has a primary function of sealing the cavity, it nay also have a function of bonding the cap to the structure. Thus, the sealing material may comprise a sealing and bonding material.

The cap body and the cavity preferably terminate at an annular rim; the cap body is preferably installed over the end of the fastener with an annular gap between the annular rim and the structure; and the sealing material preferably flows from the sealing material inlet to the annular rim and out of the annular gap to form an annular bead or fillet in contact with the structure. This arrangement enables a continuous bead of sealing material to be formed around the annular rim. That is, sealing material injected via the inlet exits the cavity via the annular gap to form such a continuous bead or fillet. This arrangement thus provides a large contact area for the seal, which in turn may provide a strong, reliable bond between the cap and structure in a relatively small footprint area.

Note that the annular rim, annular gap and annular bead may be circular, or they may have any other annular shape such as hexagonal or elliptical depending on the shape of the cap. Therefore the term "annular" is used herein to refer to an element which forms a closed shape running round a circumference of the cap, which may or may not be circular.

The method may include connecting the ridges to die end of the fastener to fasten the cap to the end of the fastener. In this way, the cap is held in place over the end of the fastener during injection of the sealing material. This connection may be formed by a connection feature such as a protrusion, indentation or serration formed in the ridge.

A second aspect of the present invention provides a cap for forming a seal around an end of a fastener protruding from a structure, the cap comprising: a cap body with a cavity for receiving the end of the fastener; a sealing material inlet comprising an opening in the cap body that is in fluid communication with the cavity, the opening being arranged to interconnect with a sealing material injection device to provide a flow of curable sealing material from the sealing material inlet into the cavity to contact the end of the fastener in the cavity; three or more ridges protruding from the cap body into the cavity, the ridges being arranged to contact the end of the fastener in the cavity; and three or more channels between the ridges, the channels being arranged to enable the curable sealing material to flow from the sealing material inlet along the channels into contact with the end of the fastener and into contact with the structure.

The advantages discussed in relation to the first aspect above are equally relevant to the second aspect. In particular, the ridges may serve to both locate the cap on the end of the fastener and grip the end of the fastener.

The cap body and the cavity preferably terminate at an annular rim, and the channels are preferably arranged to enable the curable sealing material to flow from the sealing material inlet along the channels to the annular rim.

Each channel is preferably separated from its neighbour by one of the three or more ridges, each channel being wider than each ridge at the annular rim.

The cap body preferably comprises a body portion containing the sealing material inlet: and an annular skirt which terminates at the annular rim. At least part of the annular skirt bends outwardly from the body portion to increase an angle of the annular skirt relative to a central axis of the cap body. In this way, the area of sealing material in contact with the structure to which the cap is to be bonded can be maximised without increasing the overall diameter of the cap.

Each ridge preferably comprises a mechanical connection feature capable of fastening the cap to the end of the fastener. The connection feature may comprise one or more projections, such as a snap-fit projection, arranged to interconnect with one or more corresponding recess features in the end of the fastener.

Each ridge may protrude beyond the annular rim. Thus, sealing material can be injected into the cap so that it projects out beyond the annular rim to form a bead or fillet. Such an arrangement improves both the sealing and bonding properties of the seal.

There is preferably a void, or gap, between an end portion of each ridge and the annular rim. This cut away feature serves to provide an uninterrupted seal (bond line, bead or fillet) around the periphery of the cap.

The sealing material inlet may comprise a projection (such as a boss) in the cap body. the projection containing the opening and being arranged to interconnect with the sealing material injection device. The opening of the sealing material inlet may be centred on a central axis of the cap body. Such a central position ensures an even flow to the whole circumference of the cavity. Alternatively, the opening may be offset from the central axis in some embodiments in order to enable installation of the cap in confined spaces. It may be necessary in such cases to incorporate restriction features or other features into the cap to ensure that the flow of sealant material is able to provide an even seal.

A third aspect of the present invention provides apparatus for forming a sealed cavity around an end of a fastener protruding from a structure, the apparatus comprising: a cap according to the second aspect: and a sealing material injection device having a nozzle arranged to interconnect with the sealing material inlet of the cap to direct a flow at curable sealing material into the cavity.

By providing the cap separately from the curable sealing material, the sealing material can be a quick cure sealing material of the type which has a short working life, since it is applied directly to the assembled cap, optionally via a static mixing nozzle.

The injection device may be powered manually, eletrically, or by compressed air. The injection device may be arranged to deliver a fixed volume of sealing material to thereby ensure a controlled and consistent application process.

The curable sealing material may be a two-part adhesive or sealant material, the two parts of which are mixed together in the nozzle of the injection device before injection into the cap. Alternatively, the two parts may be pre-mixed before delivery via the nozzle of the injection device.

A preferred material for the sealing material is a sealant material such as a two-part polysulphide based sealant or manganese dioxide based sealant. A suitable polysulphide based sealant is MC-238 Class A/B, produced by Naftoseal™. Two-part sealants can be mixed within an applicator gun before delivery, as discussed above, but typically have a much longer cure time than two-part adhesives. In particular, the time taken to achieve a robust seal capable of withstanding accidental knocks etc may be 12 hours or more, compared to approximately 1 hour for an epoxy adhesive. However such sealant materials may be preferred to an epoxy adhesive since they can easily be cut by a knife in order to remove the cap.

Alternatively the curable sealing material may comprise an epoxy based adhesive that has good flow characteristics, most preferably a two-part epoxy based adhesive such as Scotch-Weld™ 7256 B/A, produced by 3M™. Such two-part adhesives are supplied in the form of cartridges (50 ml cartridges, or larger cartridges, being preferred) which can be loaded into the injection device. The two parts of the adhesive are mixed within the nozzle of the injector gun on application.

Epoxy based adhesives are free-flowing, have a low viscosity, and exhibit rapid cure at room temperature. By mixing the two-part adhesive on application it is possible to use adhesives with very short working lives, for example a working life of only a few minutes. Such adhesives could not be used with known sealing caps, which require application before assembly of the cap over the fastener end and/or by hand.

A fourth aspect of the present invention provides a joint comprising: a structure: a fastener passing through the structure with an end of the fastener protruding from the structure; and a cap terming a seal around the end of the fastener, the cap comprising: a cap body with a cavity receiving the end of the fastener; a sealing material inlet comprising an opening in the cap body; three or wore ridges protruding from the cap body into the cavity, the ridges contacting the end of the fastener in the cavity; three or more channels between the ridges; and a cured sealing material filling the cavity including the channels, the sealing material contacting the end of the fastener and the structure.

The advantages discussed above in relation to the first and second aspects are equally applicable to the third and fourth aspects.

Typically the end of the fastener protruding from the structure comprises a bolt, a nut screwed onto the bolt, and a washer between the nut and the structure. The ridges may contact the nut but more preferably they contact the washer. The nut and washer engage may each other via respective spherical surfaces to accommodate relative tilt between them.

Each ridge may comprise a first connection feature and the end of the fastener may comprise one or more corresponding connection feature (such as an annular groove or a series or notches) each first connection feature being interconnected with a corresponding connection feature. In this way, the cap is fastened to the fastener end by the interconnected connection features.

The cap both may be formed by injection moulding, preferably from a thermoplastic material such as a glass-filled polyetherimide (PEI). A suitable glass-filled PEI is Ultem™ 2400, which includes 40% glass fibres by volume. Optionally, the cap body is transparent in order to observe the sealing material as it is injected.

The annular parts of the cap (that is, the annular rim, the annular skirt, and the annular gap) may have a generally circular shape in cross-section, or they may be any other closed shape in cross-section such is hexagonal or square (for instance to enclose a fastener with a hexagonal or square shape).

In preferred embodiments the sealing material (or sealing and bonding material) fills the cavity to also bond the cap to the structure. The bond between the cap and the structure is thus formed by the cap-sealant material bond and the sealant material-structure bond.

In any of the above aspects a cap according to the present invention may enclose each end of the fastener, so that the joint is sealed from both sides of the structure.

The structure is preferably a structural component of an aircraft, more preferably a structural component of an aircraft wing, and most preferably a structural component of an aircraft wing which forms a boundary wall of a fuel tank. The structure preferably comprises a composite structural component, and the fastener may be a metal fastener. In such cases a lightning strike may be particularly likely to occur at the fastener. The structure typically comprises a pair of structural parts which are joined together by the fastener. In such aircraft applications the sealed cavity of the cap can safely prevent out-gassing or sparking events in the event of a lightning strike. The sealing material also provides a fluid tight seal around the end of the fastener, thus preventing fuel leakage through the hole in the structure through which the fastener passes.

The cap of the method of the first aspect may comprise a cap according to the second aspect, and the method may result in a joint according to the fourth aspect. The method may use apparatus according to the third aspect. Similarly the joint of the fourth aspect may comprise a cap according to the second aspect.

Any of the optional, or desirable, features discussed above or below in relation to any of the aspects of the invention may be applied to any other aspect, either individually or in any combination.

BRIEF DESCRIPTION OF THE DRAWINGS

Embodiments of the invention will now be described with reference to the accompanying drawings, in which.

DETAILED DESCRIPTION OF EMBODIMENT(S)

Figure 2:
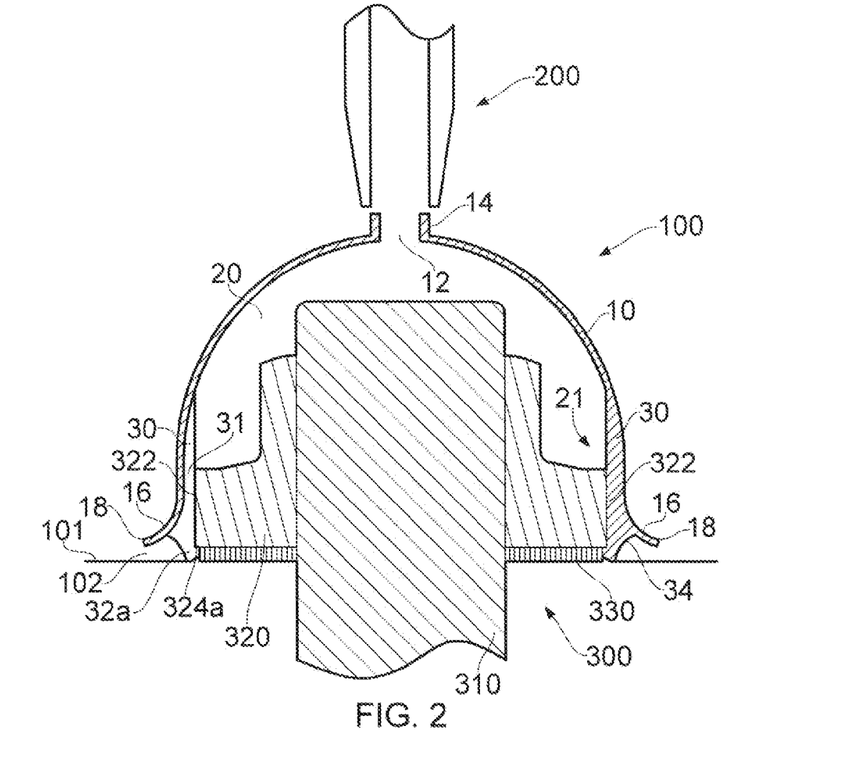
FIG. 2 is a cross-sectional view of a nut cap according to a first embodiment of the invention and a sealing material injection device, taken along lines A and B in FIG. 3.
Figure 3:
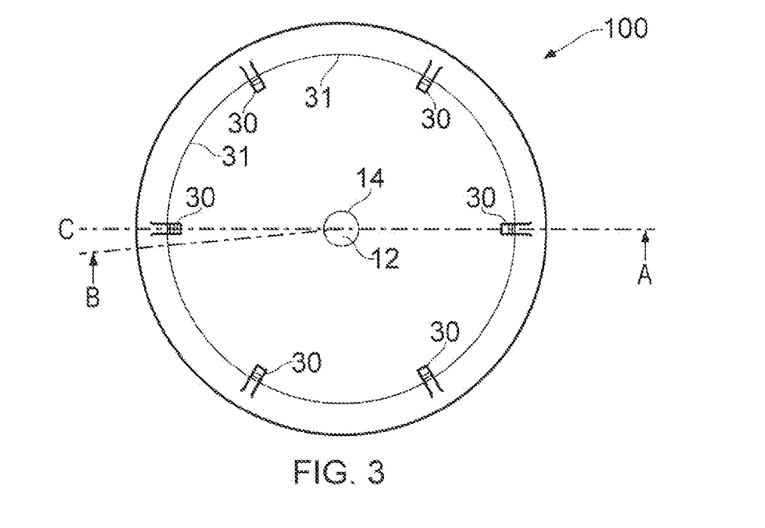
FIG. 3 is view of the inboard (bottom) end of the nut cap of the first embodiment, showing the section lines A, B along which the cross-section of FIG. 2 is taken.
Figure 4:
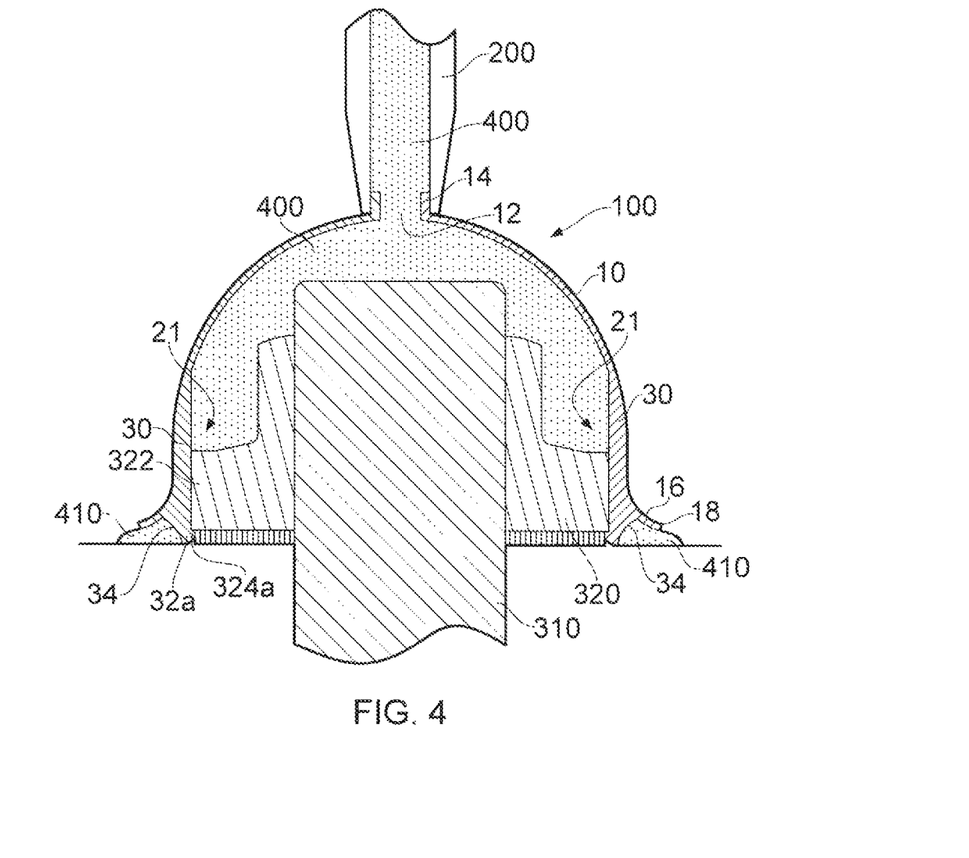
FIG. 4 is a cross-sectional view of the nut cap of the first embodiment, taken along lines A and C in FIG. 3, shown after injection of sealing material via the sealing material injection device.

FIGS. 2-4 show a first embodiment of the present invention, while the other embodiments of FIGS. 5-12 differ from the first embodiment in only minor ways. Equivalent features of each embodiment are identified by the same reference numerals.

The injectable nut cap 100 in FIG. 2 includes a cap body 10 defining an inner cavity 20. The outboard (upper) part of the cap body 10 is dome shaped. The cap body 10 has an axially central opening 12 from which extends a tubular collar or boss 14 which is capable of interconnection with the nozzle 200 of a sealing material injection device. The outer diameter of the boss 14 is sized to be received within the nozzle 200 as shown in FIG. 4. Fitting the nozzle 200 over the boss 14 is preferred (rather than vice versa) since it does not restrict the flow or sealant material and results in a less directional flow of sealant into the cap. Optionally the nozzle may interconnect with the boss via a bayonet fitting or similar. The inner diameter of the boss 14 may reduce gradually in the injection direction with a 3 to 5 degree taper if required.

The inboard (lower) part of the cap body has an annular flared skirt 16 which projects radially outwardly at an acute angle to the central cap axis and terminates at an annular rim 18. Six evenly distributed ridges 30 project inwardly into the cavity 20 from the cap body 10, each ridge 30 comprising an elongate member which extends along the lower (inboard) half of the cavity 20 in an axial direction. Although six ridges are shown in this example, the number of ridges may vary from three to seven.

The section of FIG. 2 is taken along a line A through one of the ridges 30 on the right-hand side, and a line B on the left-hand side which does not pass through the opposite ridge 30 but rather passes through a channel 31 below the ridge. The section of FIG. 4, on the other hand, passes through both opposite ridges 30, along lines A and C.

In FIGS. 2, 4, 5 and 6 the nut cap 100 is shown installed over the protruding tail end of a fastener 300 which passes through a structure 101. The fastener comprises a bolt 310, a nut 320 and a washer 330. Each of the ridges 30 engages a cylindrical outer wall 322 of the nut 320, thus dividing the base half of the cavity 20 into six separate channels 31 between the ridges 30. The ridges 30 may engage the wall 322 via a clearance fit or a transitional fit. The ridges 30 also control the relative radial position of the cap 100 by means of their dimensions in a radial direction. That is, uniformly distributed ridges 30 of equal axial width will ensure that the cap 100 is co-axial with the fastener 300.

The washer 330 has a reduced outer diameter compared with the nut 322, so the nut 320 has an annular overhanging portion 324a. Each ridge 30 has a mechanical connection feature comprising a snap-fit projection 32a which protrudes radially inwardly from the lower (inboard) end of its respective ridge 30.

During assembly of the cap 100 onto the fastener 300, the snap-fit projection 32a flexes outwardly to enable the cap body 10 to slide over the nut 320. Once the cap 100 is in its final position as shown in FIG. 2, the snap-fit projection 32a snaps back and returns to its original shape such that it interlocks with the overhanging portion 324a of the nut 320. This interlocking connection impedes the cap 100 from being lifted on and away from the nut 320 during injection of sealing material (described below).

Figure 5:
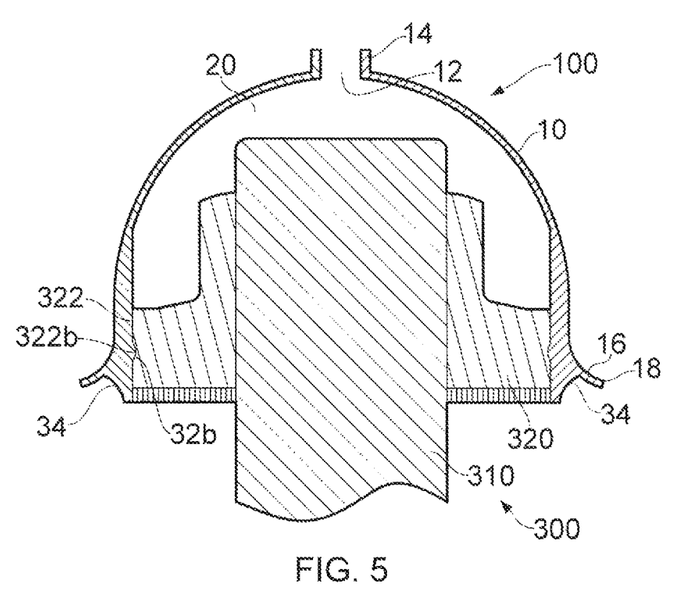
FIG. 5 is a cross-sectional view of a nut cap according to a second embodiment of the invention.
Figure 6:
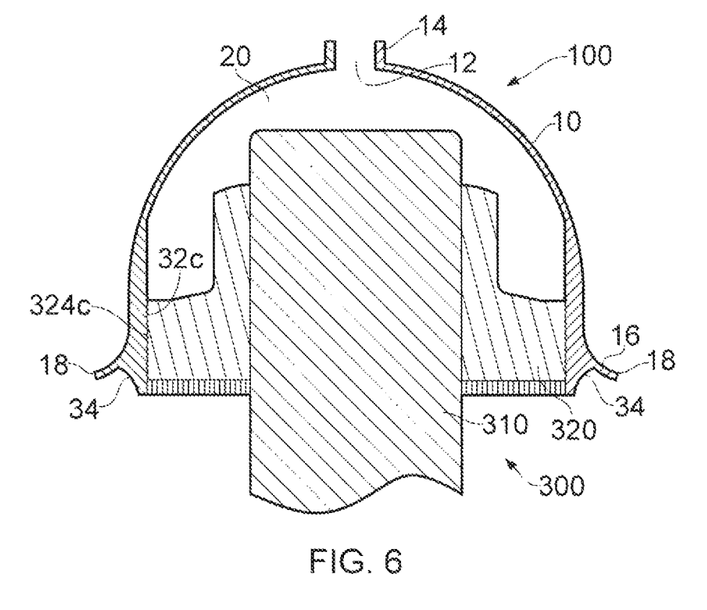
FIG. 6 is a cross-sectional view of a nut cap according to a third embodiment of the invention.

In FIG. 5 each connection feature comprises a circumferentially-extending projection 32b which interlocks with a corresponding circumferentially-extending recess or groove 322b in the outer wall 322 of the nut 320. In FIG. 6 each connection feature comprises a serrated surface 32c which engages with a corresponding serrated surface 324c in the outer wall of the nut 320. Each serrated surface 32c, 324c may comprise a plurality of ridges, troughs, peaks, recesses, or similar.

Returning to FIG. 4, when connected to the boss 14, the nozzle 200 of the sealing material injection device delivers a continuous flow of sealing material 400 into the cavity 20 via the opening 12. The sealing material 400 flows into the cap 100 so that it completely fills the cavity 20, contacting the end of the fastener as it does so without any air gaps remaining. It then flows into contact with the structure 102—again without any air gaps remaining. The cavity 20 has a constriction 21 where the nut 320 meets the ridges 30. This constriction 21 tends to hold back the sealing material until it has completely filled the outboard (upper) part of the cavity 20 above the constriction 21. Once the sealing material has completely filled the outboard part of the cavity, the pressure builds up and forces the sealing material to flow past the constriction and along the channels 31 to the annular rim 18 which forms the inboard end of the cavity 20.

The annular rim 18 lies in a plane parallel with the structure 101, and each ridge 30 extends within the cavity 20 towards the plane of the annular rim 18 then continues to extend through the plane of the annular rim 18 to a protruding inboard end which engages the structure 101 as shown in FIG. 2. Since the ridges 30 protrude axially beyond the plane of the annular rim 18 there is an annular gap 102 (shown in FIG. 2) between the annular rim 18 and the structure 101. This annular gap 102 provides an outlet for sealing material 400 which has flowed along the channels 31, thus enabling the sealing material 400 to extrude out of the gap 102 and form a continuous annular bead or fillet 410 around the periphery of the cap 100. The ridges 30 also each have a concave cut-away profile 34 at their inboard (bottom) end, the cut-away profile 34 providing a void between the inboard end of the ridge and the annular rim 18 to ensure that the annular gap 102 is not interrupted in the region of the ridges 30 and the bead 410 has o consistent profile.

A suitable alternative material 400 is a two-part polysulphide based sealant such as MC-238 Class A/B, produced by Naftoseal™. An alternative material 400 is a two-part epoxy based structural adhesive such as Scotch-Weld™ 7256 B/A. This adhesive is supplied in cartridge form (50 ml cartridges being preferred) and mixed within the nozzle 200 on application by the injector gun. Such epoxy based adhesives are free-flowing, have to low viscosity, and exhibit rapid cure at room temperature.

The cap 100 is injection moulded front a thermoplastic material such as glass-filled polyetherimide (PEI). A suitable glass-tilled PEI is Ultem™ 2400, which includes 40% glass fibres by volume. The cap 100 may alternatively be made by moulding, by an additive manufacturing process, or by any other suitable process. The ridges 30 are formed integrally with the cap body 10.

During installation, the cap 100 is first placed in the position shown in FIG. 2, with the tail end (or alternatively the head end) of a fastener 300 enclosed within the cavity 20 and gripped by the ridges 30. The nozzle 200 of the sealing material injector gun is then inserted over the boss 14 to create a temporary seal therebetween. The pre-mixed sealing material 400 is then injected from the nozzle 200 into the cavity 20, where it collects. The flow of sealing material 400 is constricted in the channels between the ridges 30 so that six uniform flows are formed in each inter-ridge channel 31. The sealing material 400 completely fills the cavity 20 until it flows out through the annular gap 102 formed at the annular rim 18 and makes contact with the structure to form a fillet or bead 410, at which point the flow a sealing material 400 from the nozzle 200 is stopped.

After injection of the curable sealing material 400 into the cavity 20 the nozzle 200 is removed and the injected sealing material 400 is left to cure. On curing, it provides a strong adhesive bond between the cap 100 and the structure 102, and also between the cap 100 and the fastener 300.

The cured injected sealing material 400 also serves to fully fill and seal the cavity 20. Thus, sparking and out-gassing events caused during a lightning strike can be contained. Ingress of fuel, water or other contaminants into the cavity 20 is also prevented.

The sealing material injection method of the present invention avoids the accumulation of air pockets (i.e. entrapment of air) within the cavity 20, since a uniformly distributed coverage of sealing material is achieved. Such air pockets are particularly undesirable because they may provide sites for uncontrolled sparking or out-gassing events and also cause the seal to be compromised and a consequent leakage of fuel through the fastener joint.

Figure 7:
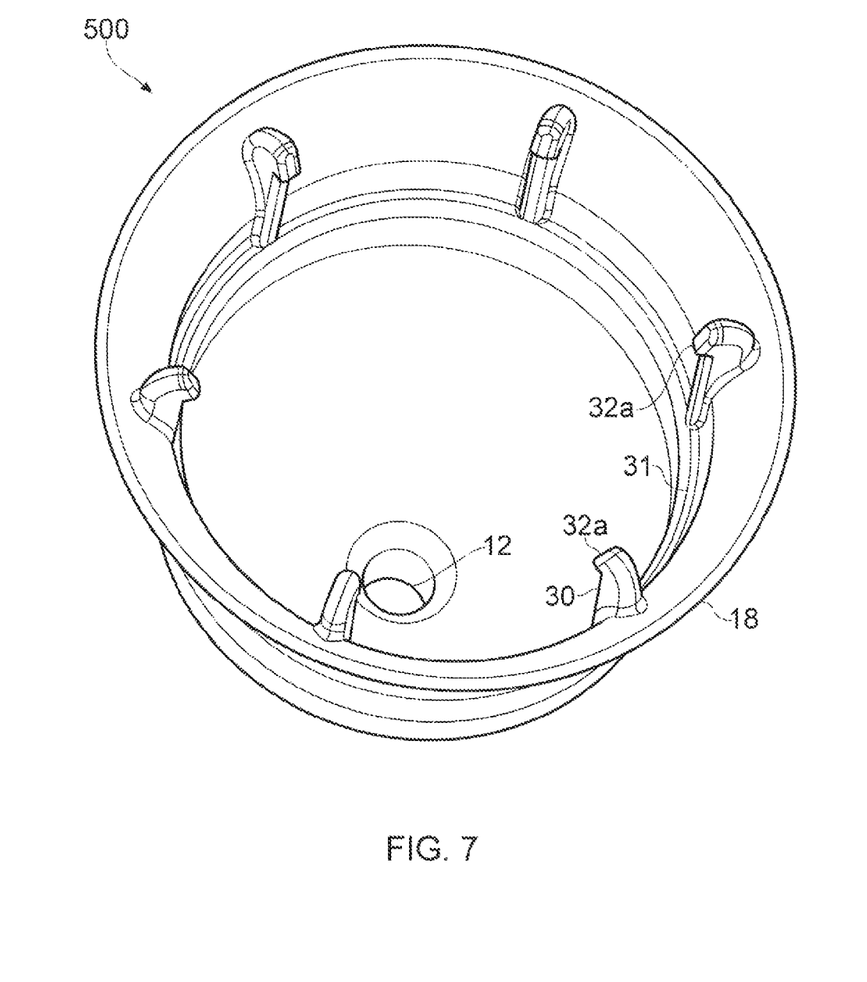
FIG. 7 is an underside isometric view of a nut cap according to a third embodiment of the invention.
Figure 8:
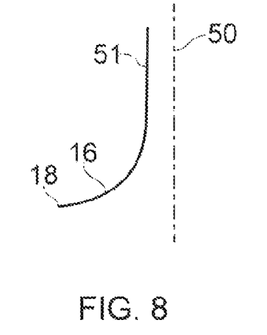
FIGS. 8 to 11 shows four different skirt shapes.
Figure 9:
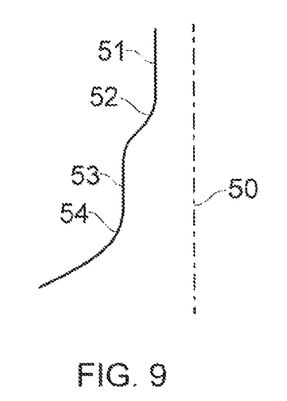

FIG. 7 shows a cap 500 similar to the cap 100, with equivalent features having the same reference number. The skirt of the cap 500 has a slightly different profile to that of the cap 100, as shown in FIGS. 8 and 9. FIG. 8 shows the skirt 16 of the cap 100, and a line 50 parallel with the central axis of the cap. The cap body has a cylindrical body portion 51 parallel with the line 50, and the skirt 16 bends outwardly from the body portion along its entire length to the annular rim 18. Thus the angle of the skirt 16 relative to the central axis of the cap body increases continuously along its entire length all the way to the annular rim, and the skirt 16 consists of a single continuously curved flange. In the case of FIG. 9 (which is a sectional view of the skirt of the cap 500 of FIG. 7) the skirt bends outwardly from the body portion 51 to form a flared shoulder 52, then bends inwardly to form an un-flared cylindrical skirt portion 53, then bends outwardly again to form a flared flange 54. Thus the angle of the annular skirt 16 relative to the central axis of the cap body increases continuously along only part of its length (i.e. at the shoulder 52 and the flange 54).

Figure 10:
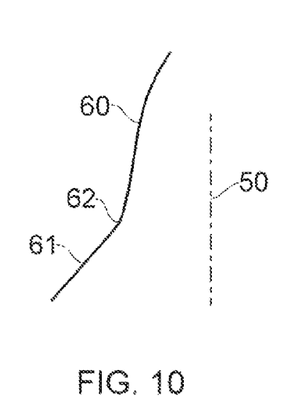

FIG. 10 shows a further alternative skirt shape. In this case the body portion 60 is domed (so the angle of the body portion 60 relative to the central axis is continuously decreasing). A flared skirt or flange 61 bends outwardly from the body portion 60 at a corner 62 and then has an unbent (conical) shape along its length to its annular rim.

Figure 11:
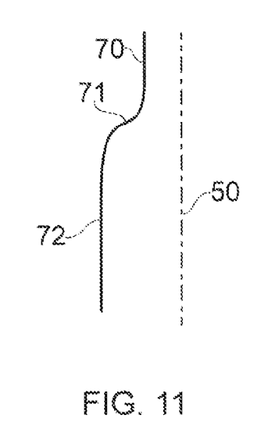

In the case of FIG. 11 the skirt bends outwardly from a body portion 70 to form a shoulder 71, then bends inwardly to form an un-flared cylindrical skirt portion 72. Thus the angle of the skirt relative to the central axis of the cap body increases only in the shoulder portion 71.

Figure 12:
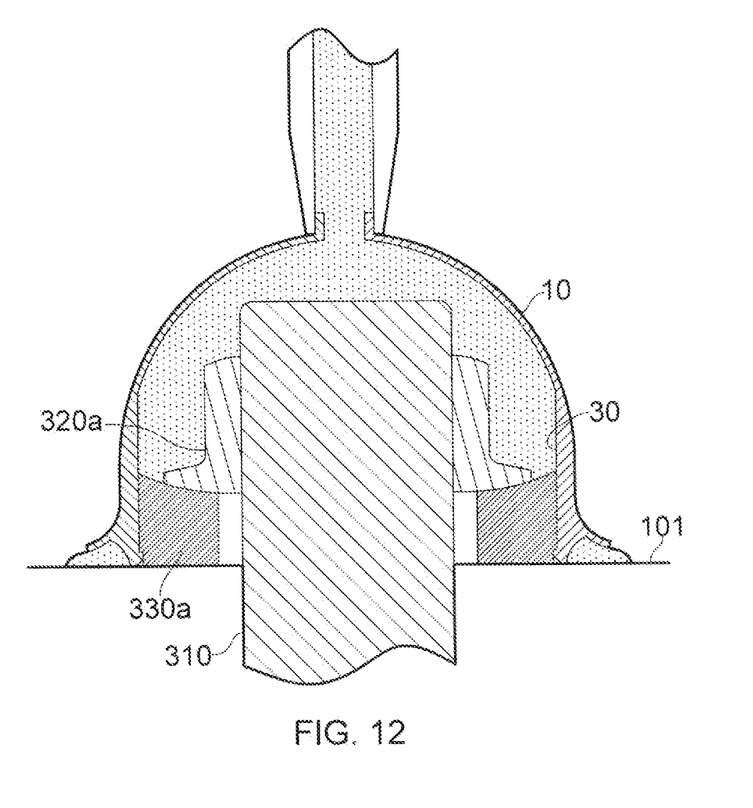
FIG. 12 is a sectional view of a further nut cap shown after injection of sealing material via the sealing material injection device.

FIG. 12 shows an alternative fastener assembly which can accommodate tilt of the bolt 310 relative to the surface of the structure 101. Washer 330 is replaced by a washer 330a with a concave spherical upper surface which engages a corresponding convex circular surface on the nut 320a. Thus if the axis of the bolt 310 is not precisely perpendicular to the surface of the structure 101 then the spherical surfaces enable the nut 320a to be tilted by up to 5° relative to the washer 330a. Sufficient clearance is provided between the top edge of the bolt 310 and the domed upper surface of the cap body 10 to accommodate this. The fact that the ridges 30 engage the washer 330a rather than the nut 320a enables the tilt to be accommodated.

The base of the washer 330a is formed with an annular groove with an overhanging annular face which interlocks with the snap-fit projections of the ridges 30 of the cap.

Although the invention has been described above with reference to one or more preferred embodiments, it will be appreciated that various changes or modifications may be made without departing from the scope of the invention as defined in the appended claims.

The invention claimed is:

1. A method of forming a seal around an end of a fastener protruding from a structure, a cap comprising a cap body with a cavity; a sealing material inlet comprising an opening in the cap body; three or more ridges protruding from the cap body into the cavity; and three or more channels between the ridges, the method comprising:
   installing the cap body over the end of the fastener so that it is enclosed within the cavity and contacted by the ridges;
   injecting sealing material into the cavity via the sealing material inlet so that the sealing material flows along the channels, fills the cavity, contacts the end of the fastener, and contacts the structure; and
   curing the sealing material to form the seal;
   wherein the cap body and the cavity terminate at an annular rim; the cap body is installed over the end of the fastener with an annular gap between the annular rim and the structure; and the sealing material flows from the sealing material inlet to the annular rim and out of the annular gap to form an annular bead in contact with the structure.

2. The method of claim 1, further comprising fastening the ridges to the end of the fastener with connection features.

3. The method of claim 1, wherein the structure comprises a structural component of an aircraft.

4. A cap for forming a seal around an end of a fastener protruding from a structure, the cap comprising:
a cap body with a cavity for receiving the end of the fastener;
a sealing material inlet comprising an opening in the cap body that is in fluid communication with the cavity, the opening being arranged to interconnect with a sealing material injection device to provide a flow of curable sealing material from the sealing material inlet into the cavity to contact the end of the fastener in the cavity;
three or more ridges protruding from the cap body into the cavity, the ridges being arranged to contact the end of the fastener in the cavity; and
three or more channels between the ridges, the channels being arranged to enable the curable sealing material to flow from the sealing material inlet along the channels into contact with the end of the fastener and into contact with the structure,
wherein the cap body and cavity terminate at an annular rim lying in a plane, and each ridge extends within the cavity towards the plane of the annular rim then continues to extend through the plane of the annular rim to a protruding inboard end.

5. The cap of claim 4, wherein each ridge comprises a connection feature capable of fastening the cap to the end of the fastener.

6. The cap of claim 5 wherein the connection feature comprises a protrusion, indentation or serration formed in the ridge.

7. The cap of claim 4, wherein the channels are arranged to enable the curable sealing material to flow from the sealing material inlet along the channels to the annular rim.

8. The cap of claim 7, wherein the cap body comprises a body portion containing the sealing material inlet; and an annular skirt which terminates at the annular rim,
wherein at least part of the annular skirt bends outwardly from the body portion to increase an angle of the annular skirt relative to a central axis of the cap body.

9. The cap of claim 4, further comprising a void between the protruding inboard end of each ridge and the annular rim.

10. The cap of claim 4, wherein the sealing material inlet comprises a collar, boss or other protruding part which is arranged to interconnect with the sealing material injection device.

11. Apparatus for forming a sealed cavity around an end of a fastener protruding from a structure, the apparatus comprising:
a cap according to claim 4; and
a sealing material injection device having a nozzle arranged to interconnect with the sealing material inlet of the cap to direct a flow of curable sealing material into the cavity.

12. A joint comprising:
a structure;
a fastener passing through the structure with an end of the fastener protruding from the structure; and
a cap forming a seal around the end of the fastener, the cap comprising: a cap body with a cavity receiving the end of the fastener; a sealing material inlet comprising an opening in the cap body; three or more ridges protruding from the cap body into the cavity, the ridges contacting the end of the fastener in the cavity; three or more channels between the ridges; and a cured sealing material filling the cavity including the channels, the sealing material contacting the end of the fastener and the structure,
wherein the cap body and the cavity terminate at an annular rim, the cap body is installed over the end of the fastener with an annular gap between the annular rim and the structure, and the cured sealing material forms an annular bead of sealing material in the annular gap.

13. The joint of claim 12, wherein each ridge comprises a first connection feature and the end of the fastener comprises three or more corresponding second connection features, each first connection feature being interconnected with a second connection feature.

14. The joint of claim 13 wherein the structure is a structural component of an aircraft.

15. The joint of claim 12 wherein the end of the fastener protruding from the structure comprises a bolt, a nut screwed onto the bolt, and a washer between the nut and the structure; and wherein the ridges contact the washer.

16. The joint of claim 15 wherein the nut and washer engage each other via respective spherical surfaces.

17. The joint of claim 12 wherein the annular bead of sealing material fills the annular gap.

18. The joint of claim 12 wherein the annular bead of sealing material forms a continuous bead of sealing material around the annular rim.

19. The joint of claim 12 wherein the continuous bead of sealing material around the annular rim protrudes radially beyond the annular rim.

* * * * *